United States Patent
Foreman et al.

(10) Patent No.: US 6,172,808 B1
(45) Date of Patent: *Jan. 9, 2001

(54) HANDS-FREE BINOCULARS ASSEMBLY

(76) Inventors: Philip C. Foreman, 2211 Sutter Ave., Santa Clara, CA (US) 95050; Daniel K. Meeker, 660 Mariposa Ave., #305; David Scott, 900 High School Rd., #2222, both of Mountain View, CA (US) 94041

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/867,604

(22) Filed: Jun. 2, 1997

Related U.S. Application Data

(63) Continuation of application No. 08/296,320, filed on Aug. 25, 1994, now abandoned.

(51) Int. Cl.[7] .............................. G02B 25/00; G02C 1/00
(52) U.S. Cl. .................... 359/481; 359/408; 359/411; 351/41; 351/158
(58) Field of Search ........................ 359/399, 408–419, 359/511, 480–482; 351/41, 124, 156, 158, 53–58, 69–82, 87, 88, 131–132, 136–138

(56) References Cited

U.S. PATENT DOCUMENTS

| | | | | |
|---|---|---|---|---|
| 395,872 | * | 1/1889 | Briggs ................................ 359/411 |
| 1,851,579 | * | 3/1932 | Hixon ................................. 359/481 |
| 3,029,696 | * | 4/1962 | Schmidt ............................. 359/481 |
| 3,394,980 | * | 7/1968 | Dym ..................................... 351/41 |
| 3,418,737 | * | 12/1968 | Lambert ............................. 351/158 |
| 3,597,041 | * | 8/1971 | Frantz ............................... 359/411 |
| 4,637,696 | * | 1/1987 | Wilkins ............................. 351/158 |
| 4,976,531 | * | 12/1990 | Kahaney ........................... 351/156 |
| 4,986,644 | * | 1/1991 | Yang ................................. 359/411 |
| 5,076,682 | * | 12/1991 | Pasfield ............................ 351/158 |
| 5,159,359 | * | 10/1992 | Pauly et al. ...................... 351/124 |
| 5,181,139 | | 1/1993 | Benitez ............................. 359/408 |
| 5,381,263 | * | 1/1995 | Nowak et al. ..................... 351/158 |

* cited by examiner

*Primary Examiner*—Thong Nguyen
(74) *Attorney, Agent, or Firm*—James C. Peacock, III

(57) ABSTRACT

A binocular assembly which is held in optical alignment with a human being's eyes and without the use of a human being's hands. The binocular assembly includes a support member, a pair of optical systems positioned and mounted on the support member for magnifying items within view of the human beings eyes, an adjustment to laterally adjust and position the pair of optical systems laterally relative to one another to accommodate spacing between the human beings eyes, and a fastener for engaging the human being's head and securing the binocular assembly about the head of the human being.

18 Claims, 3 Drawing Sheets

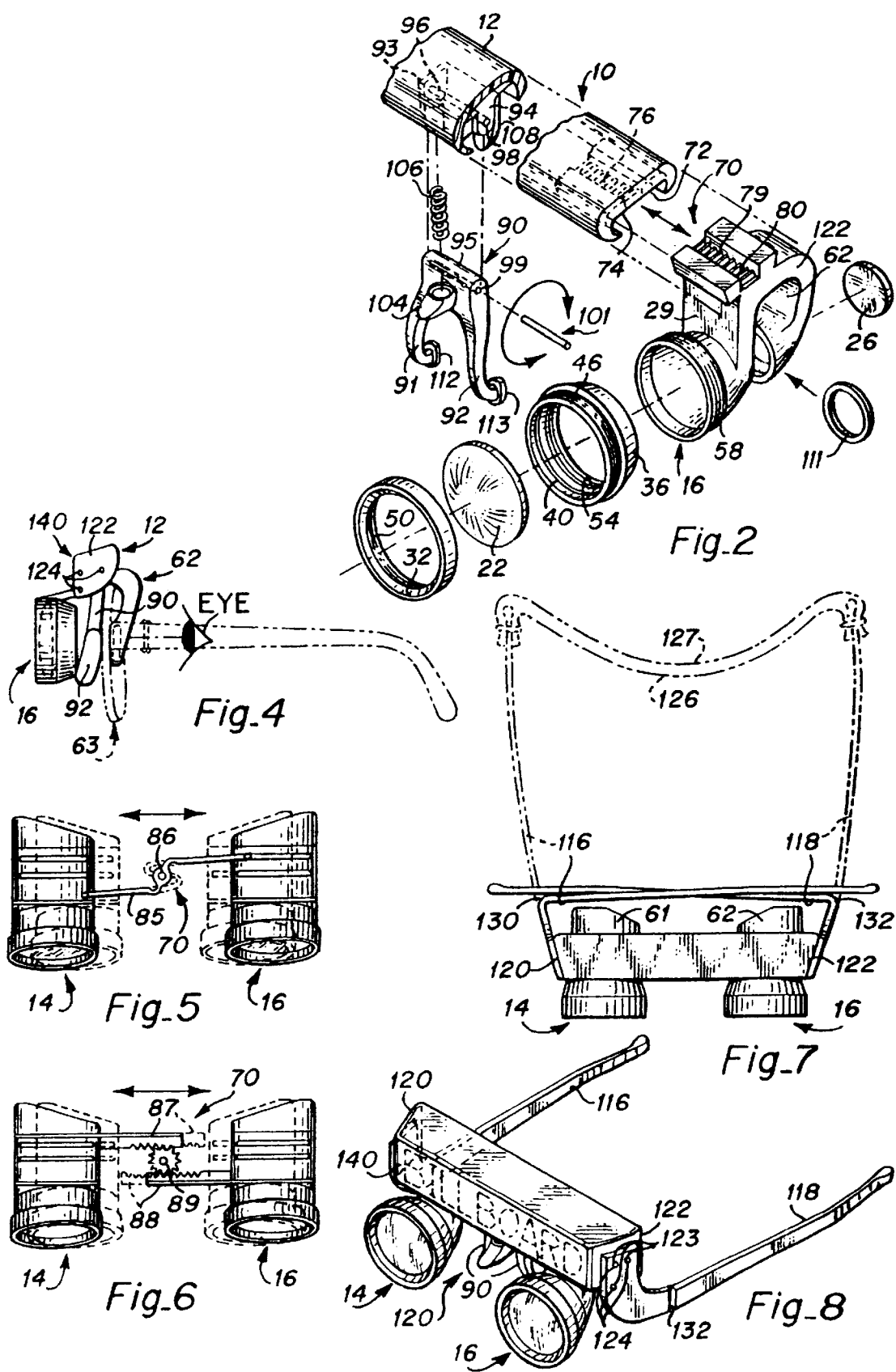

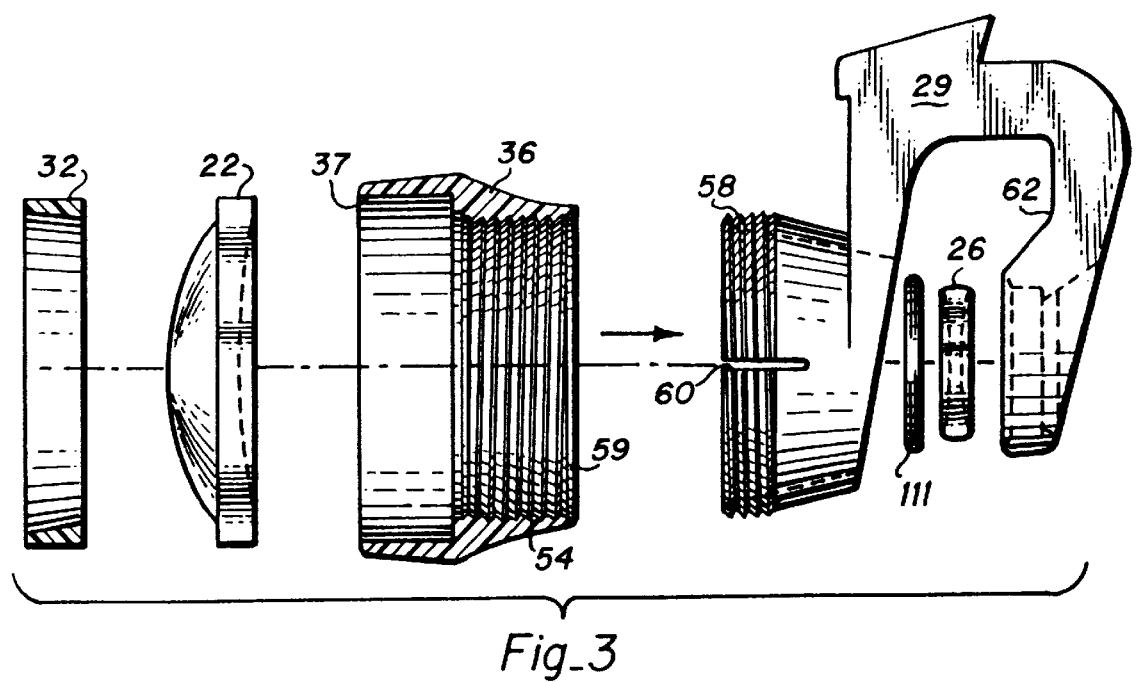
Fig_3

HANDS-FREE BINOCULARS ASSEMBLY

This application is a continuation of application Ser. No. 08/296,320 filed Aug. 25, 1994, now abandoned.

BACKGROUND OF THE INVENTION

1. Field of the Invention

This invention relates generally to a binoculars assembly. More particularly, this invention relates to a binoculars assembly in combination with a securing means for support of the assembly by the users head.

2. Description of the Prior Art

It is often desirable for an observer to utilize magnification means at events which occur at a distance point. Examples include spectators at a sporting event, concert or theater where a large crowd of people often require an individual to be a great distance from the event being viewed. Because of a spectator's distance from the desired viewing event, individuals often bring binoculars which must be hand-held to their eyes when using. Holding binoculars can be inconvenient and tiresome, and therefore deter some people from utilizing them. Some people need to remove their eyeglasses or sunglasses each time they desire to use binoculars. Other people desire to view the entire event through binoculars, an act which can tire the individual's arms. Therefore, it is beneficial to provide an individual with a magnification means which does not need to be held by hand, is inexpensive, easy to transport, quick and easy to use, and can enhance the spectators enjoyment of the viewing event.

Prior art includes hand-held binoculars, and binoculars which can be attached to hats, visors or helmets. U.S. Pat. No. 5,181,139 issued to Jose A. Benitez is designed to be attached to a visor.

SUMMARY OF THE PRESENT INVENTION

It is therefore an object of the present invention to provide a binocular assembly which is easy and convenient to use.

It is another object of the present invention to provide a binocular assembly which does not need to be held by hand.

It is another object of the present invention to provide a binocular assembly which is inexpensive and easy to manufacture.

It is another object of the present invention to provide a binocular assembly which is durable and rugged in construction.

It is another object of the present invention to provide a binocular assembly which can be utilized while the user wears eyeglasses or sunglasses.

It is another object of the present invention to provide a binocular assembly which is adjustable for distant viewing.

It is another object of the present invention to provide a binocular assembly which is convenient to store when not in use.

It is another object of the present invention to provide a binocular assembly which is easy to adjust for any pair of eyeglasses or sunglasses.

It is another object of the present invention to provide a binocular assembly which is light in weight.

It is another object of the present invention to provide a binocular assembly which provides a mounting method which positions the eyepiece lens closer to the user's eyes than if eyeglass lens were positioned between the user's eyes and the eyepiece lens.

Briefly, a preferred embodiment of the present invention includes a binocular assembly which is held in optical alignment with a human being's eyes and without the use of the human being's hands. The binocular assembly includes a support member, a pair of optical systems positioned and mounted on the support member for magnifying items within view of the human beings eyes, means to laterally adjust and position the pair of optical systems laterally relative to one another to accommodate spacing between the human beings eyes, and securing means for engaging the human being's head and securing the binocular assembly about the head of the human being.

An advantage of the present invention is that it provides a binocular assembly which is easy and convenient to use.

An advantage of the present invention is that it provides a binocular assembly which does not need to be held by hand.

An advantage of the present invention is that it provides a binocular assembly which is inexpensive and easy to manufacture.

An advantage of the present invention is that it provides a binocular assembly which is durable and rugged in construction.

An advantage of the present invention is that it provides a binocular assembly which can be utilized while the user wears eyeglasses or sunglasses.

An advantage of the present invention is that it provides a binocular assembly which is adjustable for distant viewing.

An advantage of the present invention is that it provides a binocular assembly which is convenient to store when not in use.

An advantage of the present invention is that it provides a binocular assembly which is easy to adjust for any pair of eyeglasses or sunglasses.

An advantage of the present invention is that it provides a binocular assembly which is light in weight.

An advantage of the present invention is that it provides a binocular assembly which provides a mounting method which positions the eyepiece lens closer to the user's eyes than if eyeglass lens were positioned between the user's eyes and the eyepiece lens.

An advantage of the present invention is that it provides a binocular assembly which is positioned to allow the user to possess a field of view underneath the binocular assembly without repositioning the binocular assembly.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIG. 2 is an exploded partial cross-sectional view of the binocular assembly of FIG. 1 taken along the line 2—2;

FIG. 3 is an exploded side view of an alternative embodiment of the binocular assembly of the present invention with an alternative means for attaching and positioning the front objective lens with the binocular assembly;

FIG. 4 is a side view of the binocular assembly of FIG. 1 mounted to eyeglasses, illustrated in ghost lines;

FIG. 5 is a top view of an alternative embodiment of the binocular assembly of the present invention with means for adjusting the lateral width;

FIG. 6 is a top view of an alternative embodiment of the binocular assembly of the present invention with an alternative means for adjusting the lateral width;

FIG. 7 is a top view of the binocular assembly of FIG. 1 in an alternative embodiment with two earpieces, said earpieces shown folded and also with ghost lines showing the two earpieces extended with a strap attached between them; and FIG. 8 is a perspective view of the binocular assembly of FIG. 1 with attachable earpieces.

DETAILED DESCRIPTION OF THE PREFERRED EMBODIMENT

Figure 1:
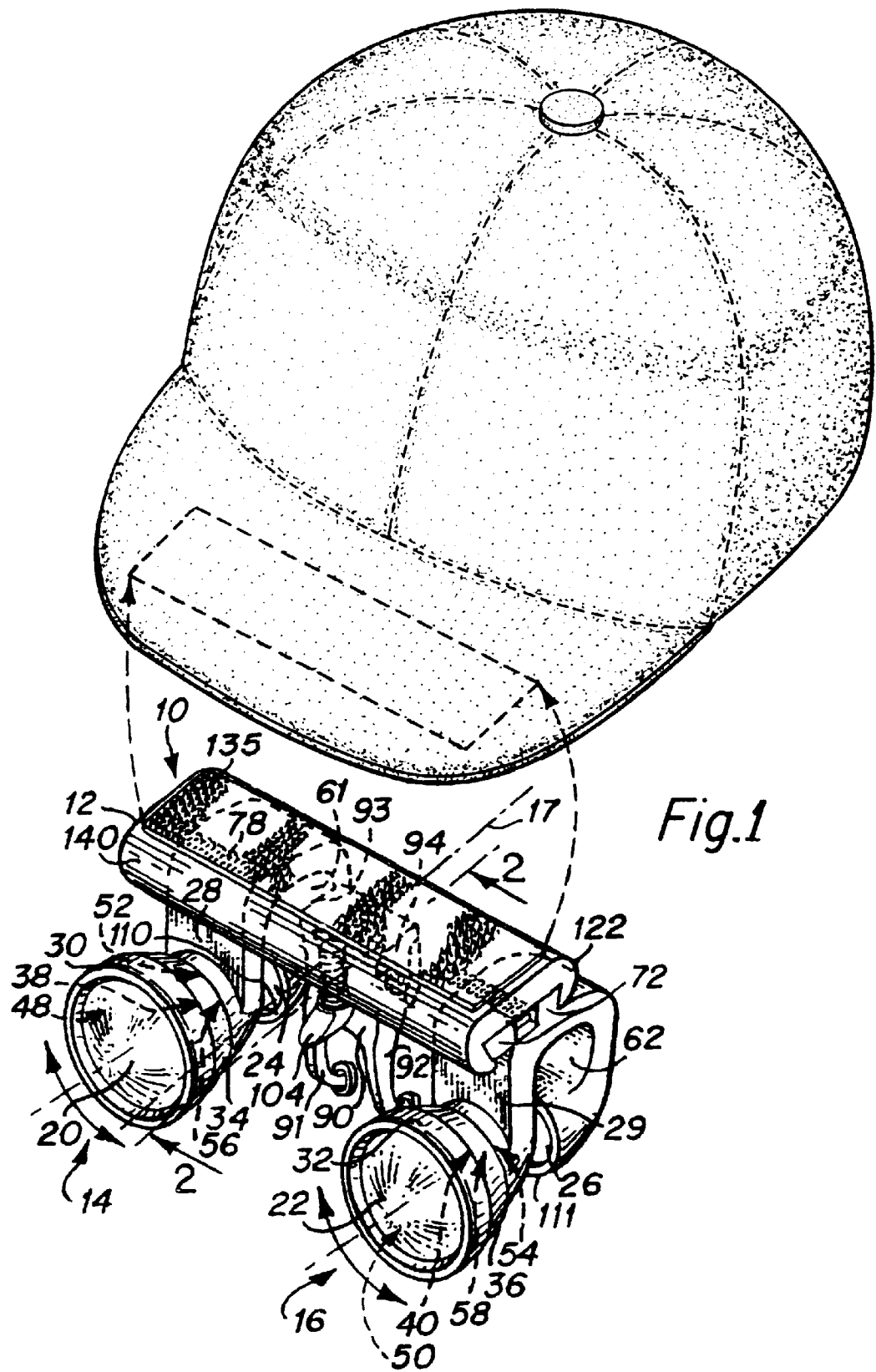
FIG. 1 is a perspective view of a binocular assembly of the present invention.

FIG. 1 is a perspective view and FIG. 2 is an exploded partial cross-sectional view of a hands-free binocular assembly, referred to by general reference 10, embodying the principles of the present invention. The binocular assembly 10 includes a support member 12, and a right and left optical system, referred to by general reference numbers 14 and 16, respectively.

The optical systems 14 and 16 are positioned and mounted laterally relative to one another on the support member 12 and about opposite sides of a central line 17 of the support member 12. Each of the optical systems 14 and 16 respectively, include a front objective lens 20 and 22, a rear ocular lens 24 and 26, and an optical housing 28 and 29. The right objective lens 20 is positioned co-planar relative to the left objective lens 22, and the right ocular lens 24 is positioned co-planar relative to the left ocular lens 26. The objective lenses 20 and 22 are positioned in optical alignment with the ocular lenses 24 and 26, respectively.

About the edge of each objective lens 20 and 22 is a front securement ring 30 and 32 and rear objective lens housing 34 and 36, respectively. Each rear housing 34 and 36 contains a canal 38 and 40 about the front interior surface for receipt of the objective lens 20 and 22, respectively. Each objective lens 20 and 22 is securely positioned inside the associated canal 38 and 40. Each rear housing 34 and 36 contains exterior threads 44 and 46 about the front side, and each front housing 30 and 32 contains interior threads 48 and 50 about the rear side, respectively. By positioning the objective lenses 20 and 22 inside the canals 38 and 40, and mating the rear housing threads 44 and 46 with the front housing threads 48 and 50, the objective lenses 20 and 22 are securely positioned.

FIG. 3 illustrates an alternative embodiment for attaching the rear objective lens housing 36 with the front housing 32 is for the rear housing 36 to contain an interior canal 37 about the front side for receipt of the objective lens 22 and front housing 32. The diameter of the canal 37 closely corresponds with the diameter of the front housing 32, thereby allowing the front housing 32 to be pressed securely within the canal 37.

As FIGS. 1 and 2 illustrates, each objective lens 20 and 22 is movable about an axis of rotation of said objective lens 20 and 22, respectively. Each rear objective lens housing 34 and 36 contains a rear interior threaded surface 52 and 54 for mating engagement with exterior threaded surfaces 56 and 58 of each optical system housing 28 and 29, respectively. When the threaded surfaces 52 and 54 are mated with the threaded surfaces 56 and 58 respectively, the objective lenses 20 and 22 rotate about their axis of rotation and move farther or nearer relative to the optically aligned rear ocular lens 24 and 26. This rotational movement and spacing between the rear lens 24 and 26 and the front lens 20 and 22 respectively, provides an individualized focusing means for each optical system 14 and 16.

FIG. 3 illustrates an alternative embodiment for attaching and position the rear objective lens housing 36 with the optical system housing 29. About the rear housing 36 is the rear interior threaded surface 54 which discontinues before reaching a rear surface 59 of the rear housing 36. The optical system housing 29 contains the exterior threaded surface 58 of a length shorter than the threaded surfaces 54, and includes one or more narrow slots 60 perpendicular to the threaded surface 58. Responsive to pressure, the interior threaded surface 54 "snaps" and/or "slides" in a perpendicular direction over the exterior threaded surface 58 securing the rear housing 36 to the optical system 29. This provides the user with an individualized focusing means for the optical system 29. Because the interior threaded surface 54 discontinues before touching the rear surface side 59 of the end of the lens housing 36, surface 54 "snaps" over the entire area of the exterior threads 58 preventing the housing 36 from inadvertently disconnecting itself from the optical system 29. The slot(s) 60 allow the exterior threaded surface 58 to adjust to the pressure applied when the user is adjusting the distance between the rear ocular lens 26 and the front lens 22.

Each rear ocular lenses 24 and 26 is positioned by a rear optical system sector 61 and 62. Between the rear ocular lens 24 and 26 and the front optical housing 28 and 29 is a space wide enough for the user's eyewear 63 to fit within, as illustrated in FIG. 4. This embodiment positions the rear ocular lens 24 and 26 closer to the user's eyes thereby (1) increasing the user's apparent field of view; (2) increasing the binocular assemblies 10 magnification due to the user's eyes positioned closer to the rear ocular lens 24 and 26; and (3) reducing the cantilevered weight of the binocular assembly 10 out beyond the support member 12 because the binocular assembly 10 is nearer the user's head. The rear ocular lens 24 and 26 are positioned high enough about the user's eyewear 63 so the user may look underneath and avoid utilizing the binocular assembly 10 without repositioning the binocular assembly 10.

The binocular assembly 10 contains a lateral adjustment means referred to by general reference 70, for positioning each optical system 14 and 16 laterally relative to the other optical system 16 and 14 to accommodate spacing between the users eyes. FIGS. 1 and 2 illustrate a lateral adjustment means 70 including a C-shaped channel 72 extending along a bottom surface 74 of the support member 12 from the right side to the left side of the support member 12. The bottom interior surface 74 of the C-shaped channel 72 contains a plurality of longitudinally grooved ridges 76. Each optical system 14 and 16 contains a track 78 and 79 with a plurality of longitudinal ridges 80 along the track 78 and 79 top surface. Each track 78 and 79 is positioned within the C-shaped channel 72, and the plurality of longitudinal ridges 80 along each track 78 and 79 are fictionally engage with the C-shaped channel's bottom grooved ridge surface 76. Each pair of optical systems 14 and 16 may be moved laterally within the C-shaped channel 72 responsive to hand pressure of the user, to coordinate lateral spacing between the systems 14 and 16.

FIG. 5 illustrates an alternative embodiment for laterally adjusting each optical system 14 and 16. A connecting means 85 is attached to and extending between each optical system 14 and 16. Positioned midway along the connecting means 85 is a hinged point 86 allowing the connecting means 85 to move laterally. As the connecting means 85 moves laterally in response to hand pressure, the connecting means 85 bends and adjusts the interpupillary distance between the optical systems 14 and 16 while keeping the optical systems 14 and 16 centralized.

FIG. 6 illustrates an alternative embodiment for laterally adjusting the optical system 14 and 16. The lateral adjusting means 70 includes a rack 87 and a rack 88 attached to optical system 14 and 16, respectively. A gearwheel 89 is mated in congruently interlocking relation to the notched surface of each rack 87 and 88, and rotates as each rack 87 and 88 is moved laterally. Hand pressure applied by the user laterally to the optical systems 14 and 16 moves the racks 87 and 88, thereby rotating the gearwheel 89 and adjusting the lateral space between the two optical systems 14 and 16. As the gearwheel 89 rotates, the optical systems 14 and 16 remain centralized while the interpupillary distance between the optical systems 14 and 16 change.

Referring again to FIGS. 1 and 2, the binocular assembly 10 includes a nosepiece 90 attached to the support member 12, located about the central line 17 and between the optical systems 14 and 16. The nosepiece 90 contains a right and left post 91 and 92 extending away from the bottom surface 74 of the support member 12. The posts 91 and 92 are spaced apart from one another so the user's nose may fit between the posts 91 and 92 and support the binocular assembly 10 along the bridge of the users nose when not using eyewear 63.

About each side of the central line 17 is a right and left support post 93 and 94 attached to and extend from the bottom surface 74 of the support member 12. Each support post 93 and 94 contains an aperture 96 and 98 extending parallel with the support member 12. Positioned between each post 93 and 94 is a top sector 95 of the nosepiece 90 with an elongated aperture 99 in alignment and parallel with support post apertures 96 and 98. A cylindrical pivot shaft 101 is positioned and extends inside the support post 93, through the nosepiece aperture 99, and inside the support post aperture 96. The shaft 101 secures the nosepiece 90 to the support member 12 allowing the nosepiece 90 to rotate around the pivot shaft 101, so the user can comfortably position the nosepiece 90 about the user's nose when the binocular assembly 10 is utilized without eyewear 63.

Attached to the front side of the top sector 95 of the nosepiece 90 is a ledge 104 extending away from the pivot shaft 101. A compressible coil spring 106 is positioned above the ledge 104 in front of the pivot shaft 101 and between the support posts 93 and 94. A first end of the coil spring 106 abuts the top surface of the ledge 104, while a second end of the spring 106 abuts the bottom surface 74 of the support member 12. The coil spring 106 asserts pressure onto the top surface of the nosepiece ledge 104 urging the nosepiece 90 downwards and about the pivot shaft 101. A nosepiece retaining wall 108 is attached to the rear surface of the support posts 93 and 94 extending away from the bottom surface 74 of the support member 12, preventing the nosepiece 90 from rotating past the retaining wall 108. The spring 106 urges the rear nosepiece 90 surface firmly against the front retaining wall 108 surface.

A user may attach the binocular assembly 10 to the user's eyewear 63 by asserting hand pressure to the bottom surface of the nosepiece ledge 104. The hand pressure compresses the spring 106 and rotates the nosepiece 90 forward about the pivot shaft 101. The user can position the eyewear 63 in front of the retaining wall 108 and the rear optical system sectors 61 and 62, and behind the rear surface of the nosepiece posts 91 and 92 to facilitate clamping between the binocular assembly 10 and the user's eyewear 63. Attached to the front surface of each rear optical system sector 61 and 62 and the terminal end of each nosepiece post 91 and 92 is a padding means 110, 111, 112 and 113 respectively, for softening the contact to the eyewear 63.

Upon the user positioning the eyewear 63 and releasing hand pressure to the bottom surface of the ledge 104, the coil spring 106 expands rotating the nosepiece 90 about the pivot shaft 101 and securely pressuring each nosepiece padding means 112 and 113 against the front surface of the users eyewear 63. This pressure causes the rear surface of the user's eyewear 63 to press firmly against each rear sector's padding means 110 and 111, thereby holding the binocular assembly 10 to the user's eyewear 63.

FIGS. 7 and 8 illustrate an alternative embodiment for securing the binocular assembly 10 to the user's head. A right and left earpiece 116 and 118 extends over the user's right and left ear, respectively, and towards a right and left surface 120 and 122, respectively of the support member 12. The earpieces 116 and 118 each include a plurality of apertures 123 for receiving a plurality of stubs 124 protruding perpendicular from both surfaces 120 and 122. The earpieces 116 and 118 may be attached to or detached from the support member sides 120 and 122 by inserting or withdrawing the stubs 124 from the apertures 123 responsive to hand pressure asserted by the user. When this embodiment is utilized the binocular assembly 10 is secured to the users head in a similar manner as eyeglasses. The nosepiece 90 is positioned so that the nosepiece 90 will contact the user's nose and support the binocular assembly 10, only when the binocular assembly 10 is used without eyewear 63 and when the earpieces 116 and 118 are utilized.

An earpiece strap 126 may be attached to each of the earpiece's 116 and 118 terminal ends and for positioning about the user's head. The strap 126 may be adjusted to position the binocular assembly 10 firmly but gently against the user's face to prevent undesired shifting and sliding of the binocular assembly 10 against the user's face. When the user desires to temporarily not utilize the binocular assembly 10, the strap 126 may position the binocular assembly 10 about the users neck, keeping the user's hands free. Alternatively, when the user is utilizing the binocular assembly 10 with eyewear 63 the earpiece strap 126 may be attached to each of the user's eyewear 63 terminal ends.

The earpiece 116 and 118 also lends themselves for providing areas to receive commercial information. The earpiece includes a front planar surface 127 on which a business trade name, logo or other message may be displayed.

As FIG. 7 illustrates, each earpiece 116 and 118 includes a foldline 130 and 132 near the rear optical system sectors 61 and 62. Each foldline 130 and 132 includes a vertically aligned indented area about the exterior surface allowing each earpiece 116 and 118 to bend at the foldline 130 and 132 towards the rear sectors 61 and 62. The foldlines 130 and 132 allow the user to position each earpiece 116 and 118 adjacent to the rear sectors 61 and 62 for storing the binocular assembly 10 when not used.

An alternative embodiment for securing the binocular assembly 10 about the user's eyes is securing the binocular assembly 10 with a visor worn on the user's head. FIG. 1 illustrates a frictional adhesive attachment means 135, e.g. a fastening tape such as Velcro, along the top surface of the support member 12. About the bottom surface of the user's visor is a recipient attachment means, e.g. Velcro strip, for mating engagement with the attachment means 135. The binocular assembly 10 is attachable to the bottom of a visor worn by the user, and the nosepiece 90 may rest on the bridge of the user's nose if the user desires. Thus, even if the user does not wear eyewear 63, the binocular assembly 10 may be supported by the cap or visor.

The support member 12 also lends itself for providing areas to receive commercial information. The support member 12 includes a front planar surface 140 on which a business trade name, logo or other message may be displayed.

Although the present invention has been described in terms of the presently preferred embodiment, it is to be understood that such disclosure is not to be interpreted as limiting. Various alterations and modifications will no doubt become apparent to those skilled in the art after reading the above disclosure. Accordingly, it is intended that the appended claims be interpreted as covering all alterations and modifications as fall within the true spirit and scope of the invention.

What is claimed is:

1. A binocular assembly to be worn on a head of a subject and for modifying a field of view through a pair of eyes of the subject, comprising:
   a support member that extends transversely across a central line;
   a pair of optical systems positioned and mounted laterally relative to one another on the support member and about opposite sides of the central line, each of the optical systems including an objective lens and an ocular lens, each objective lens being positioned substantially co-planar relative to the other objective lens, and each ocular lens being positioned substantially co-planar relative to the other ocular lens and in substantial optical alignment with one of said objective lenses;
   a securing means cooperating with the support member and optical systems for engaging the subject's head and securing the support member relative to the head with the optical systems in optical alignment with the subject's eyes, wherein the securing means comprises a combination nosepiece/clamp means for allowing the binocular assembly to be interchangeably worn by either: (i) resting the combination nosepiece/clamp means on a nose of the subject such that the pair of optical systems is substantially optically aligned with the subject's eyes, or (ii) clamping the combination nosepiece/clamp means to a cooperating eyewear assembly worn by the subject such that the pair of optical systems is substantially optically aligned with a pair of eyewear lenses provided by the cooperating eyewear assembly.

2. The binocular assembly of claim 1, wherein each of said objective lenses is movable farther from or nearer to the respectively aligned ocular lens such that the optical systems are adapted to focus the field of view when seen by the subject through the respectively aligned objective and ocular lenses.

3. The binocular assembly of claim 1, farther comprising:
   a pair of earpieces with one of the earpieces adapted to be attached to and extended from a right side of the support member and the other earpiece adapted to be attached to and extended from a left side of the support member, such that the earpieces are adapted to extend over and be supported by a pair of ears, respectively, on opposite lateral sides of the subject's head.

4. The binocular assembly of claim 3, further comprising:
   an earpiece strap which is adapted to be attached to and extend between each of the earpieces and also to be positioned across a rear side of the subject's head.

5. The binocular assembly of claim 3, wherein each said earpiece includes a foldline such that said earpieces are adapted to fold and be positioned adjacent to said optical systems when the binocular assembly is not being worn by the subject.

6. The binocular assembly of claim 1 wherein said combination nosepiece/clamp means comprises a nosepiece and a mounting means for mounting the nosepiece to said support member with a spring bias of rotation along a plane which includes the central line and transverse to the support member, such that the binocular assembly is adapted to be secured to the cooperating eyewear assembly by rotating the nosepiece against the spring bias to form a clamp adapted to engage the cooperating eyewear assembly when the pair of eyewear lenses is positioned between the combination nosepiece/clamp means and one of the pairs of lenses of the optical systems positioned forward of the nosepiece/clamp means.

7. The binocular assembly of claim 6, wherein,
   said nosepiece includes a padded surface which contacts the cooperating eyewear assembly when engaged by the clamp.

8. The binocular assembly of claim 1 wherein,
   each of said ocular lenses is separated from one of the objective lenses by a space adapted to receive one of said pair of eyewear lenses of said cooperating eyewear assembly such that the binocular assembly is mounted to said cooperating eyewear assembly with the ocular lens on an opposite side of one of the eyewear lenses relative to the respectively aligned objective lens.

9. A binocular assembly for cooperating with a cooperating eyewear assembly and modifying a field of view through a pair of cooperating eyewear lenses of a cooperating eyewear assembly when the cooperating eyewear assembly is worn on a head of a subject with the pair of cooperating eyewear lenses optically aligned with a pair of eyes of the subject, comprising:
   a support member that extends transversely across a central line;
   a pair of optical systems mounted laterally relative to one another on the support member and about opposite sides of the central line, each of said optical systems including an objective lens and an ocular lens, each objective lens being positioned substantially co-planar relative to the other objective lens, and each ocular lens being positioned substantially co-planar relative to the other ocular lens and in substantial optical alignment with one of the objective lenses and also being separated from the respectively aligned objective lens by a space which is adapted to receive one of the cooperating eyewear lenses such that the pair of optical systems is adapted to receive the pair of cooperating eyewear lenses within the respective spaces with the ocular lens and objective lens of each optical system positioned on opposite sides of a cooperating eyewear lens such that the pair of optical systems is substantially optically aligned with the pair of cooperating eyewear lenses received within the respective spaces and is also adapted to be substantially optically aligned with the subject's eyes when the cooperating eyewear assembly is worn by the subject.

10. The binocular assembly of claim 9, further comprising a pair of earpieces which are adapted to be attached to opposite lateral sides of at least one of the support member or the pair of optical systems and extended therefrom in an orientation such that the earpieces are adapted to be extended over and supported by two ears on opposite respective sides of the subject's head.

11. The binocular assembly of claim 10, wherein each of said pair of earpieces is removable from said binocular assembly.

12. The binocular assembly of claim 10, further comprising a nosepiece attached to the support member, wherein the nosepiece is adapted to allow the binocular assembly to rest on a nose on a face of the subject.

13. The binocular assembly of claim 12, wherein said ocular lenses are positioned rearwardly of said objective lenses with respect to being closer than the objective lenses to the subject's head when the binocular assembly is being worn, and wherein said nosepiece is mounted to said support member and is rotatable toward the objective lenses against a spring bias toward the ocular lenses, whereby rotating the nosepiece toward the objective lenses and away from the ocular lenses against the spring bias creates a clamp between the rearwardly biased nosepiece and the ocular lenses such that the binocular assembly is adapted to clamp onto a cooperating eyewear assembly with a pair of eyeglass lenses of the cooperating eyewear assembly positioned between the nosepiece and the ocular lenses, respectively.

14. A method for modifying a field of view seen through a pair of eyes of a subject also having a head and a pair of ears, comprising:

(a) providing a hands-free binocular assembly having two laterally positioned optical systems coupled to a support frame, wherein the hands-free binocular assembly is adapted to be interchangeably worn by the subject according to each of the following group of interchangeable wearing modes:

(i) securing a pair of earpieces on opposite lateral sides of the hands-free binocular assembly such that said earpieces extend therefrom in an orientation that is adapted to engage opposite sides of the subject's head with the optical systems optically aligned with the subject's eyes, (ii) securing the hands-free binocular assembly to a cooperating article of headwear that is worn on the subject's head such that said binocular assembly is suspended from the cooperating article of headwear with the optical systems substantially optically aligned with the subject's eyes and without the pair of earpieces extending from the hands-free binocular assembly, and (iii) securing the hands-free binocular assembly with a cooperating eyewear assembly having a pair of eyeglass lenses such that each of the optical systems is optically aligned with an eyeglass lens and also with one of the subject's eye's when the cooperating eyewear assembly is being worn by the subject;

(b) selecting one wearing mode from the group of interchangeable wearing modes; and (c) securing the hands-free binocular assembly relative to the subject's head according to the selected wearing mode such that the optical systems are positioned in optical alignment with the subject's eyes.

15. The method of claim 14, further comprising:

(d) adjusting a relative position of each of a pair of objective lenses provided by the optical systems along a common focal axis shared with one of a pair of optically aligned ocular lenses also provided by the optical systems in order to thereby focus the binocular assembly on objects in a magnified field of view.

16. A hands-free binocular system for providing a modified field of view seen through a pair of eyes of a subject also having a head, a nose, and a pair of ears on opposite sides of the head, comprising:

a support member that extends transversely across a central line;

a pair of optical systems positioned and mounted laterally relative to one another on the support member and about opposite sides of the central line, each of the optical systems including an objective lens and an ocular lens, each objective lens being positioned substantially co-planar relative to the other objective lens, and each ocular lenses being positioned substantially co-planar relative to the other ocular lens and in substantial optical alignment with one of said objective lenses; and a plurality of interchangeable securing means for securing the support member and pair of optical systems relative to the head of a subject such that the optical systems are in substantial optical alignment with the subject's eyes, wherein the plurality of interchangeable securing means comprises each of the following:

(i) an eyewear securing means for securing the support member and optical systems to a cooperating eyewear assembly worn by the subject such that each of the optical systems is substantially optically aligned with one of a pair of eyewear lenses of the cooperating eyewear assembly, and (ii) a headwear securing means for securing the support member and optical systems to a cooperating visor of an article of headwear such that the optical systems extend from the cooperating visor in substantial optical alignment with the subjects eyes when the article of headwear is worn on the subject's head, and (iii) an earpiece means for securing the support member and optical systems to the subject's head with a pair of earpieces supported by the subject's ears, wherein the earpiece means is adapted to be used independently of the headwear securing means.

17. The binocular assembly of claim 16 further comprising, lateral adjustment means including connecting means attached to and extending between the two optical systems for providing relative lateral adjustment between each of said optical systems about said central line.

18. The binocular assembly of claim 16 wherein, the plurality of securing means further comprises a combination nosepiece/clamp means attached to the support member and which comprises a nosepiece means for supporting the binocular assembly on a nose of the subject and also a clamp means for clamping at least a portion of the nosepiece means to a cooperating eyewear assembly.

* * * * *